US011251939B2

United States Patent
Steele

(10) Patent No.: US 11,251,939 B2
(45) Date of Patent: Feb. 15, 2022

(54) APPARATUSES, METHODS AND SYSTEMS FOR COMMON KEY IDENTIFICATION IN DISTRIBUTED DATA ENVIRONMENTS

(71) Applicant: Quantifind, Inc., Menlo Park, CA (US)

(72) Inventor: Andrew Steele, Seattle, WA (US)

(73) Assignee: Quantifind, Inc., Menlo Park, CA (US)

( * ) Notice: Subject to any disclaimer, the term of this patent is extended or adjusted under 35 U.S.C. 154(b) by 309 days.

(21) Appl. No.: 16/551,441

(22) Filed: Aug. 26, 2019

(65) Prior Publication Data
US 2020/0076584 A1 Mar. 5, 2020

Related U.S. Application Data

(60) Provisional application No. 62/725,905, filed on Aug. 31, 2018.

(51) Int. Cl.
*H04L 9/08* (2006.01)
(52) U.S. Cl.
CPC .................. *H04L 9/0819* (2013.01)
(58) Field of Classification Search
USPC ........ 380/283, 255, 264, 276; 726/2, 21, 36; 713/150, 163, 181
See application file for complete search history.

(56) References Cited

U.S. PATENT DOCUMENTS

| 7,384,443 | B2 * | 6/2008 | Mirchandani | C22C 1/051 75/236 |
| 7,788,484 | B2 * | 8/2010 | Paya | H04L 51/00 713/156 |
| 7,917,495 | B1 * | 3/2011 | Chapman | G06F 16/24532 707/713 |
| 9,384,227 | B1 * | 7/2016 | Xiao | G06F 16/278 |
| 2004/0205242 | A1 * | 10/2004 | Xu | H04L 69/329 709/245 |
| 2012/0131139 | A1 * | 5/2012 | Siripurapu | H04L 65/60 709/217 |

(Continued)

OTHER PUBLICATIONS

Cao, P. et al., "Efficient Top-K Query Calculation in Distributed Networks," PODC 2004 Proceedings of the 23rd Annual ACM Symposium on Principles of Distributed Computing, pp. 206-215 (Newfoundland, Canada, Jul. 25-28, 2004).

(Continued)

*Primary Examiner* — Sharif E Ullah
(74) *Attorney, Agent, or Firm* — Irell & Manella LLP

(57) ABSTRACT

The APPARATUSES, METHODS AND SYSTEMS FOR COMMON KEY IDENTIFICATION IN DISTRIBUTED DATA ENVIRONMENTS ("KEY IDENTIFIER") provides a platform that, in various embodiments, is configurable to efficiently identify and display top keys for a keyspace (e.g., social media posts, financial data feeds, and/or the like) distributed across a plurality of worker nodes, such as in response to a client request. For example, the KEY IDENTIFIER may be configured to identify a likely set of candidate keys across the keyspace, and to count and rank those candidates. Once identified, top keys may be employed for a variety of applications or end goals, including but not limited to report generation, natural language insights, data (re-)distributing, and/or the like.

16 Claims, 10 Drawing Sheets

(56) References Cited

U.S. PATENT DOCUMENTS

| | | | | |
|---|---|---|---|---|
| 2012/0311339 | A1* | 12/2012 | Irvine | H04L 63/0428 |
| | | | | 713/176 |
| 2015/0089514 | A1* | 3/2015 | Grewal | G06F 9/546 |
| | | | | 719/318 |
| 2015/0170145 | A1* | 6/2015 | Patel | G06F 8/654 |
| | | | | 705/44 |
| 2016/0085839 | A1* | 3/2016 | D'Halluin | G06F 16/21 |
| | | | | 707/747 |
| 2016/0088072 | A1* | 3/2016 | Likhtarov | H04L 67/1008 |
| | | | | 709/226 |
| 2017/0132295 | A1* | 5/2017 | Tran | G06F 16/24578 |
| 2017/0285981 | A1* | 10/2017 | DeArment | G06F 11/07 |
| 2019/0014084 | A1* | 1/2019 | Jain | H04L 63/0254 |
| 2019/0340574 | A1* | 11/2019 | Ekambaram | H04L 67/32 |
| 2020/0372472 | A1* | 11/2020 | Kenthapadi | G06N 20/20 |

OTHER PUBLICATIONS

Metwally, A. et al., "Efficient Computation of Frequent and Top-K Elements in Data Streams," ICDT 2005, Proceedings of the 10th International Conference on Database Theory, pp. 398-412 (Edinburgh, UK, Jan. 5-7, 2005).

* cited by examiner

APPARATUSES, METHODS AND SYSTEMS FOR COMMON KEY IDENTIFICATION IN DISTRIBUTED DATA ENVIRONMENTS

PRIORITY CLAIM

This application is a non-provisional of, and claims priority under 35 U.S.C. § 119(e) to, prior U.S. provisional patent application Ser. No. 62/725,905 filed Aug. 31, 2018, entitled, "Apparatuses, Methods and Systems for Common Key Identification in Distributed Data Environments". The entire contents of the aforementioned application are incorporated herein by reference.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address efficient allocation of computing resources for storing and evaluating keyspace information in distributed date environments, and more particularly, include APPARATUSES, METHODS AND SYSTEMS FOR COMMON KEY IDENTIFICATION IN DISTRIBUTED DATA ENVIRONMENTS.

BACKGROUND

The advent of the internet and mobile device technologies have brought about a sea change in the distribution and availability of information. Ubiquitous electronic communications have resulted in large volumes of information being generated and, often, made widely available. Frequently, data is stored, received, transmitted, etc. in a distributed fashion, and a central management system (or possibly a worker system in a peer-to-peer configuration) may be called upon to answer queries about the data, such as the "top-k" most common items in a data store or data feed. When large numbers of worker systems and/or large volumes of data are involved, naïve methods for answering top-K queries can consume excessive amounts of time, processing, system memory, and bandwidth resources.

SUMMARY

The APPARATUSES, METHODS AND SYSTEMS FOR COMMON KEY IDENTIFICATION IN DISTRIBUTED DATA ENVIRONMENTS ("KEY IDENTIFIER") provides a platform that, in various embodiments, is configurable to efficiently identify and display top keys for a keyspace (e.g., social media posts, financial data feeds, sensor network data, click streams, stock tickers, telephone call records, network packet traces, electronic mail, and/or the like) distributed across a plurality of worker nodes, such as in response to a client request. The KEY IDENTIFIER may be designed to be used in a distributed data environment, or can be used with a single worker. The KEY IDENTIFIER may, in one implementation, make two passes over the data: (1) Find and collect the hashes of the top K candidate set; and (2) Get the full key and counts for each candidate hash from each worker. Once the second pass is complete, the results can be aggregated and the final top K computed and returned.

In one embodiment, a processor-implemented method is disclosed, comprising: receiving a client request to identify top keys for a keyspace; providing a hash query and unique ID to each of a plurality of keyspace worker nodes; receiving from each of the plurality of keyspace worker nodes a set of top candidate hashes and corresponding counts; identifying a set of global top candidate hashes based on the set of top candidate hashes and corresponding counts received from each of the plurality of keyspace worker nodes; providing a counts query to each of the plurality of keyspace worker nodes based on the set of global top candidate hashes; receiving a set of top candidate counts from each of the plurality of keyspace worker nodes based on the counts query; aggregating the set of top candidate counts received from each of the plurality of keyspace worker nodes to generate a set of global top key counts; selecting a set of top keys based on the set of global top key counts; and providing the set of top keys in response to the client request.

BRIEF DESCRIPTION OF THE DRAWINGS

The accompanying appendices and/or drawings illustrate various non-limiting, example, innovative aspects in accordance with the present descriptions.

Figure 1:
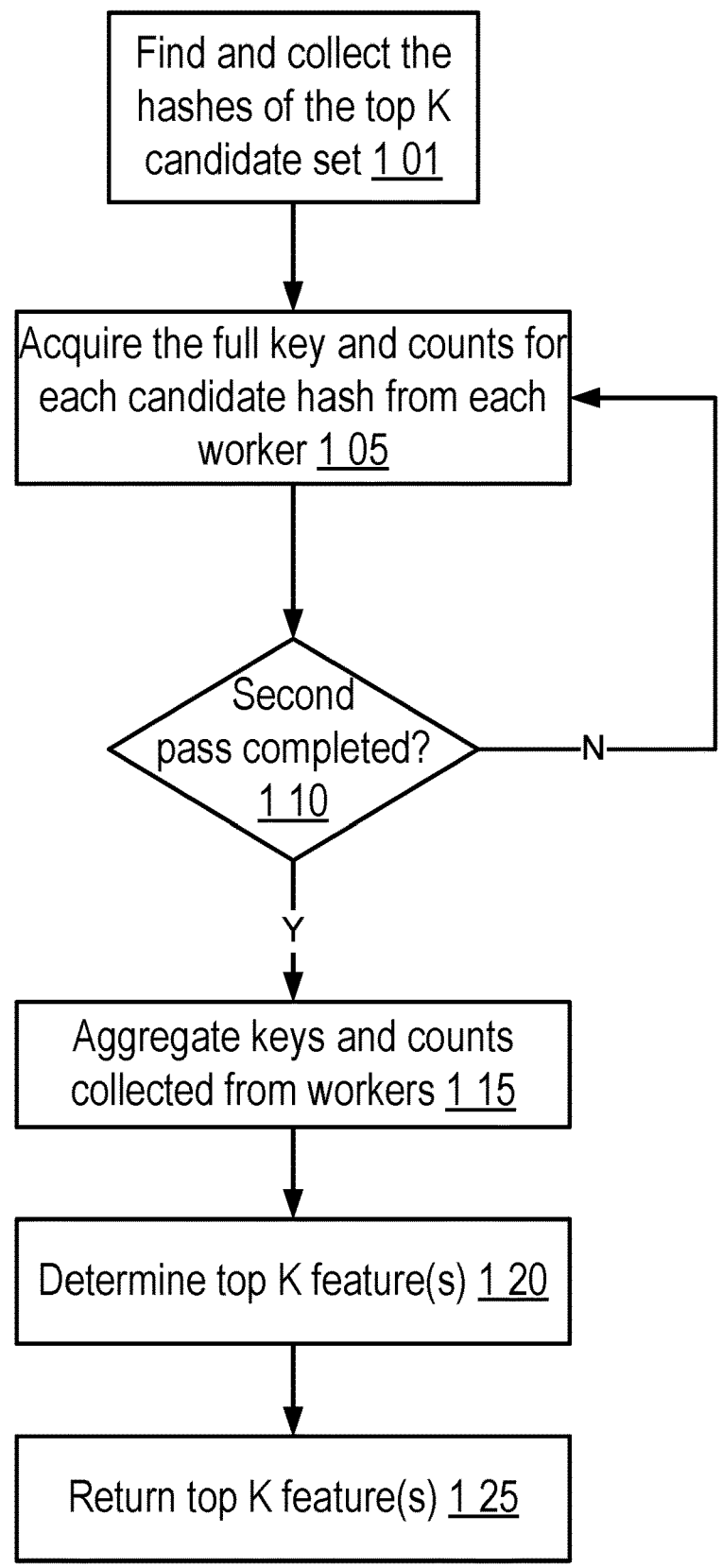
FIG. 1 shows an example of logic flow for a master process in one embodiment of KEY IDENTIFIER operation.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

The APPARATUSES, METHODS AND SYSTEMS FOR COMMON KEY IDENTIFICATION IN DISTRIBUTED DATA ENVIRONMENTS ("KEY IDENTIFIER") provides a platform that, in various embodiments, is configurable to efficiently identify and display top keys for a keyspace (e.g., social media posts, financial data feeds, sensor network data, click streams, stock tickers, telephone call records, network packet traces, electronic mail, and/or the like) distributed across a plurality of worker nodes, such as in response to a client request. For example, the KEY IDENTIFIER may be configured to identify a likely set of candidate top keys across the keyspace, and to count and rank those candidates. Once identified, top keys may be employed for a variety of applications or end goals, including but not limited to report generation, natural language insights, data (re-)distributing, sensor analysis, spam email identification, surveillance, investment redistribution, and/or the like. In various embodiments, the KEY IDENTIFIER may be configurable as a topic builder, permitting users to discover topics, tags, labels, and/or the like to assign to documents, files, and/or other elements in the keyspace, and/or to facilitate highly optimized queries over volumes of data. In other embodiments, the KEY IDENTIFIER may be configurable for generating insights regarding social media and/or other structured and/or unstructured document sources.

The KEY IDENTIFIER provides for the identification of the top K (or approximately top K) features and/or the counts of those features, such as in large key spaces where counting each individual feature may otherwise be impractical. In one embodiment, any feature type that can be represented with a 64 bit hash (with low likelihood of hash collisions) may be adapted for use by the KEY IDENTIFIER. For example, in one implementation, the KEY IDENTIFIER may be configured to find the top K n-grams (e.g., consecutive text tokens, up to 12 tokens in length) in (e.g., billions of) text comments. The entire key space of such n-grams in billions of comments (e.g., in social media feeds, microblogging, and/or the like) may be very large, such that it would likely be exceedingly difficult to store counts for every unique key (n-gram) found. However, a vast majority of keys may never appear in the top K, even for large values of K (e.g., 10000). In some embodiments, the KEY IDENTIFIER may be configured to find the likely set of candidates for the top K and then count and rank those candidates (truncating to K, in some implementations). In some embodiments, the KEY IDENTIFIER may leverage a non-uniform distribution of the key space (e.g., where some relatively small set of keys occur far more often than average).

In some embodiments, the KEY IDENTIFIER may be implemented in a distributed environment (e.g., a distributed data environment where the data is partitioned across multiple workers). In other embodiments, it may be implemented with a single worker.

Figure 2:
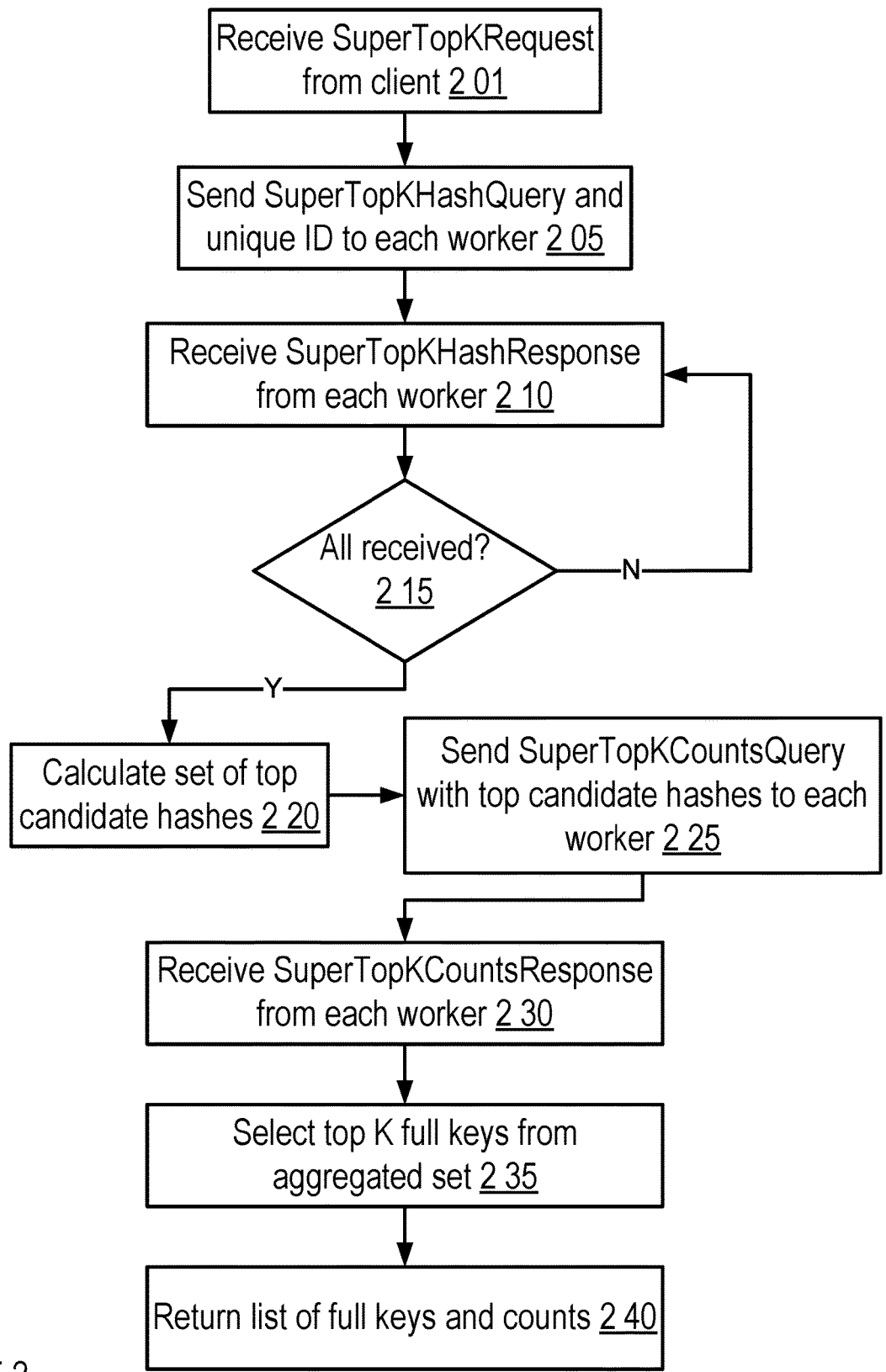
FIG. 2 shows an example of logic flow for top key query processing in one embodiment of KEY IDENTIFIER operation.

In one embodiment, the KEY IDENTIFIER may make two passes over the data, e.g., as shown in one example in FIG. 1:

1. Find and collect the hashes of the top K candidate set 101.

2. Get the full key and counts for each candidate hash from each worker 105.

Once the second pass completes 110, the results may be aggregated 115 and the final top K features computed 120 and returned 125. In alternative embodiments, further passes may be made before result aggregation and/or identification of top K features.

In one embodiment, there may be a single master process that manages the KEY IDENTIFIER call, including distributing the individual calls to the workers, aggregating and processing the responses from the workers, and returning the final result. The master's workflow may, in various implementations, take a form similar to the following example (FIG. 2):

1. Receive a SuperTopKRequest (from client) 201.

2. Send a SuperTopKHashQuery with a unique ID to each worker 205.

3. Receive a SuperTopKHashResponse from each worker containing the corresponding worker's set of hash keys and counts 210. Accumulate a global set of aggregated hash keys and counts from all workers. Track the number of workers that report counts for a given hash and track the highest minimum count returned from all the workers.

4. Once all SuperTopKHashResponses have been received 215, calculate the set of top candidate hashes 220. The final top K keys returned will be a subset of the keys that correspond to the hashes in the candidate set.

5. Send a SuperTopKCountsQuery with the top candidate hashes to each worker 225.

6. Receive a SuperTopKCountsResponse from each worker containing the corresponding worker's set of full keys and counts 230. Accumulate a global set of aggregated full keys and counts from all workers.

7. Select the top K full keys from the aggregated set 235 and return a list of the full keys and corresponding counts in order by decreasing count (the key with the highest count is first) 240.

Filtering and Worker Caching

In one embodiment, the SuperTopKRequest may contain one or more filters, such as that determine which data items and/or categories thereof can be used to generate keys for counting. For example, these filters may be passed to the workers in one or both of the SuperTopKHashQuery and the SuperTopKCountsQuery. Because the KEY IDENTIFIER makes two passes of the data, in one embodiment, the master provides a key unique to the SuperTopKRequest so that each worker can, in some implementations, cache indices for the set of items that pass the filters while processing the SuperTopKHashQuery, e.g., so that the subsequent SuperTopKCountsQuery does not again perform filtering.

SuperTopK Flavors

The KEY IDENTIFIER may, in various implementations, be employed to identify the top K of a wide variety of different kinds of features. In some embodiments, the SuperTopKRequest may include a flavor setting (e.g., which may be subsequently passed to the SuperTopKHashQuery and SuperTopKCountsQuery) that selects which variety of features to examine. In one implementation, the flavor may determine how keys are created from items that pass the requested filters, what form the full keys will take in the final response, how to sort full keys that have the same counts, and/or the like. For example, a terms flavor may create token n-grams from text comments, return the full keys as text strings, sort keys with the same counts lexically, and/or the like.

Getting and Calculating the Top Candidate Hashes

In some implementations, the number of keys counted on each worker may be too large to practically return to the master or to store the full set of aggregated counts in memory on the master, such that there exists a practical limit to the number of the top keys and counts that can be returned from each worker. Moreover, the counts and/or the set of keys can vary from one worker to the next. In one implementation, a three-phase uniform threshold ("TPUT") may be implemented to address these issues, though it may employ three sets of calls to the workers (e.g., as opposed to two sets of calls). An example of such a TPUT process configurable for use in connection with the KEY IDENTIFIER is given by P. Cao et al., "Efficient Top-K Query Calculation in Distributed Networks," PODC 2004 Proceedings of the 23rd Annual ACM Symposium on Principles of Distributed Computing, pp. 206-215 (Newfoundland, Canada, Jul. 25-28, 2004), which is incorporated in its entirety herein by reference. Given a relatively small number of workers (e.g., 30) at use in a given implementation, and a relative similarity of data on each worker, an alternative approach may be implemented whereby only two sets of calls are employed instead. However, if the number of workers substantially increases or the data on each worker is highly distinct/unique compared to the other workers, the TPUT approach, and/or the like, may be employed with relatively minor impact.

Figure 3:
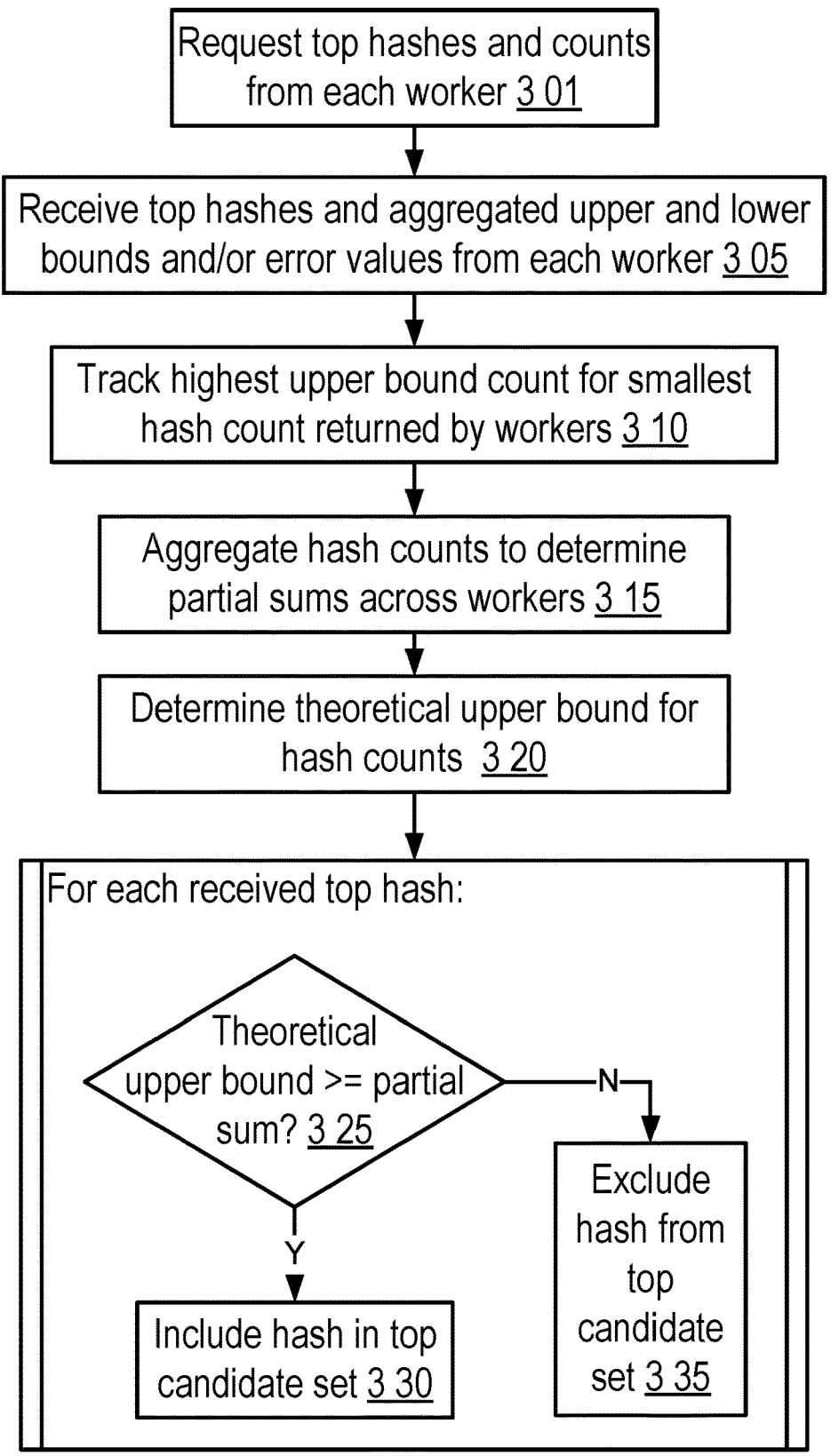
FIG. 3 shows an example of logic flow for aggregating hash counts in one embodiment of KEY IDENTIFIER operation.

In the alternative approach as shown in FIG. 3, the master may request the top hashes and counts from each worker 301. In one implementation, the number of hashes requested is larger than the requested value of K by a configurable factor (e.g., an overprovisioning factor), such as to allow acquiring enough hashes from all the workers that all of the hashes of the final top K full keys are represented, while minimizing the number of keys (with counts) that are to be both transmitted to the master and accumulated in the master. In one implementation, an overprovisioning factor of 8 may be employed for a relatively small number of workers and relatively even distribution of data among the workers. Other overprovisioning factors may be employed, depending on a wide variety of factors, including the number of workers, relative distribution of data among the workers, and/or the like.

In some implementations, employing an overprovisioning factor of 8 may yield overlap in the top keys returned from all of the workers (e.g., over 75% of the keys returned from each worker may be shared with the top keys from all other workers). If the number of workers substantially increases, the overprovisioning factor may be decreased (e.g., to reduce bandwidth and/or master memory usage), resulting in an increased likelihood of a missed top K hash should the distribution of keys be non-ideal. In one implementation, a less efficient (e.g., in time and complexity) approach (like TPUT) may be employed under such circumstances.

In one embodiment, when a SuperTopKHashResponse is received from a worker, it contains a set of (e.g., 64 bit) hash keys with corresponding count data 305. In one implementation, the count data that is returned by the workers can contain an error value in addition to the base (e.g., lower bound) count, such as to account for the underlying counting method used by the workers including uncertainty regarding the exact count for each hash. In one implementation, the error value may be determined as the difference between the upper bound and lower bound counts of the hash, such that the upper bound can be calculated by adding the error value to the base (e.g., lower bound) count. Obtaining an aggregated upper and lower bound for the counts of each hash may facilitate calculation and/or determination of the candidate set. In one implementation, for each hash key received, the master stores the combined base counts, combined error values, number of workers that contributed counts to that hash, and/or the like. Further, the master may track the highest upper bound count for the smallest hash count returned by all the workers (e.g., the maxMinCount) 310. This maxMinCount gives a global upper bound on the counts that could be missing from any worker's response due to hashes whose counts did not make the threshold for inclusion.

In one embodiment, once each worker has responded with its SuperTopKHashResponse, the master calculates the set of hashes that could be associated with a key in the top K. In one implementation, the aggregated keys and counts represent a partial sum of the actual state of those keys across all workers 315. Some keys may not have received counts from all workers and therefore are potentially undercounted. As a result, the set of keys and their aggregated base (e.g., lower bound) counts known to the master are a strict lower bound on the actual global counts. Therefore, the Kth highest aggregated base count would be less than or equal to the count of the Kth highest count in the final top K. Knowing this lower bound on the Kth count allows the master to determine which hashes could potentially have final counts greater than or equal to this lower bound. In one implementation, hashes that have a theoretical upper bound count greater than or equal to this threshold 325 may be included in the top candidate set 330, and be excluded otherwise 335. In one implementation, a theoretical upper bound count may be calculated for a given hash 320 such as in a form similar to the following example:

theoreticalUpperBoundCount=combinedBaseCounts+
combinedErrorValues+
(missingWorkerCount*maxMinCount)

The missingWorkerCount is determined by subtracting the number of workers that reported that hash from the total number of workers. Multiplying the missingWorkerCount by the global upper bound on counts from unreported hashes gives an upper bound for the counts not known to the master for that hash.

Getting the Final Keys and Counts

Figure 4:
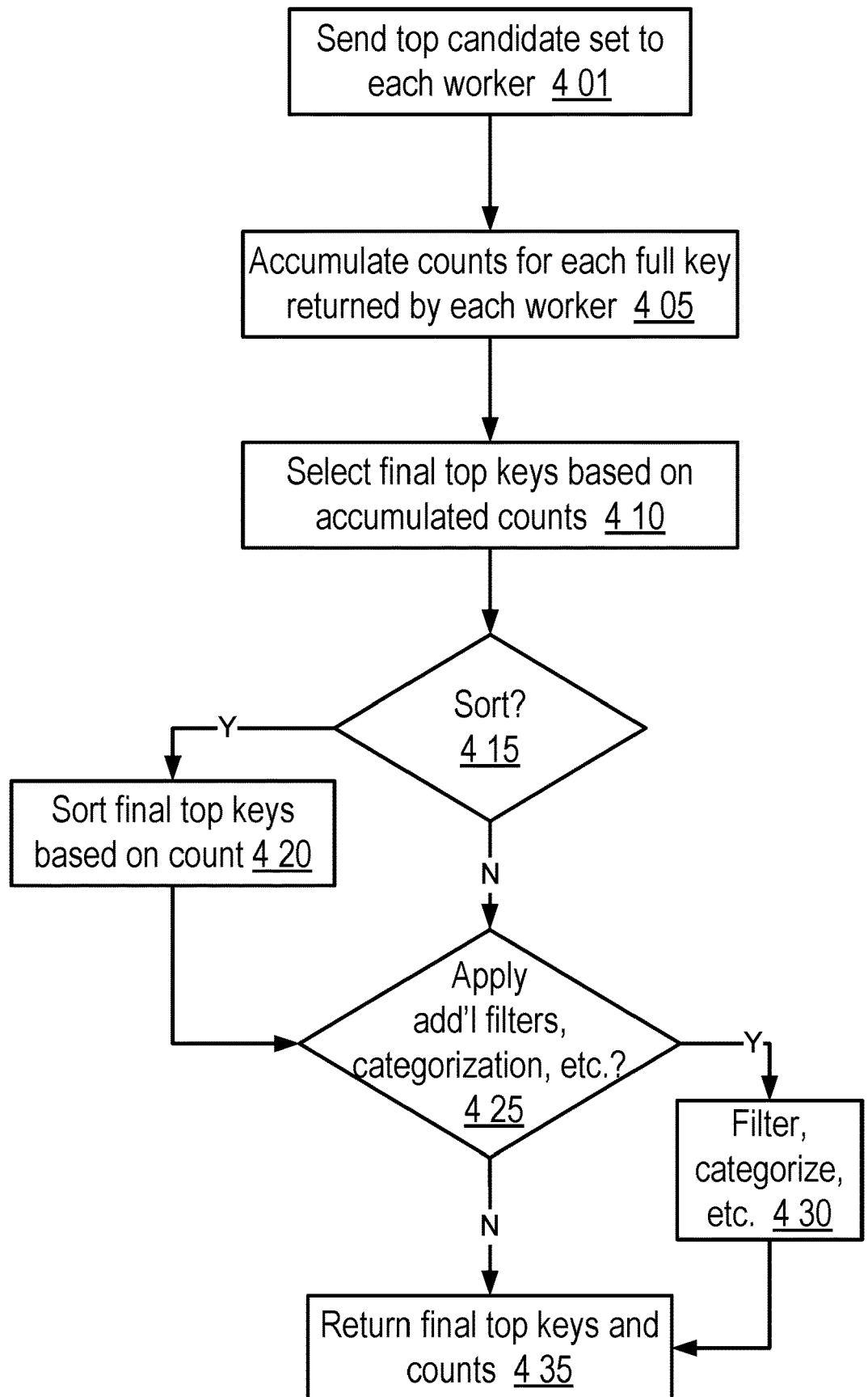
FIG. 4 shows an example of logic flow for obtaining final keys and counts in one embodiment of KEY IDENTIFIER operation.

In one embodiment as shown in FIG. 4, once the set of candidate hashes are calculated, this set is sent to each worker in a SuperTopKCountsQuery 401 to get the count and full key for each of the hashes. In one implementation, if a given worker does not have any instances of a key that maps to a given hash, it may not return a key or count for that hash (e.g., in one implementation, zero counts are not returned). The master then accumulates the counts for each full key returned by each worker's SuperTopKCountsResponse 405. In one implementation, once all of the workers have responded, the master selects the top K keys 410 and (e.g., in order by decreasing count 415, 420 and/or subject to further filtering, categorization, and/or the like 425, 430) returns to the original caller the list of keys and counts 435.

The LongStreamSummary7 Process

In one embodiment, the LongStreamSummary7 process may be used to find and count the most common (e.g., 64 bit) keys from a potentially huge key space. In implementations, for each key stored in the LongStreamSummary7 structure, it can provide an upper and lower bound on the number of times that key was seen within the limits of the data structure. In some implementations, the process may include aspects of a Stream Summary with Space Saving process, such as described in A. Metwally et al., "Efficient Computation of Frequent and Top-K Elements in Data Streams," ICDT 2005, Proceedings of the 10th International Conference on Database Theory, pp. 398-412 (Edinburgh, UK, Jan. 5-7, 2005), which is incorporated in its entirety herein by reference, and may provide similar or the same results with greater efficiency in terms of time, memory usage, and/or the like. By contrast with the Space Saving process, implementations of the LongStreamSummary7 process may support multiple concurrent updates from different threads.

The LongStreamSummary7 Structure

Figure 5:
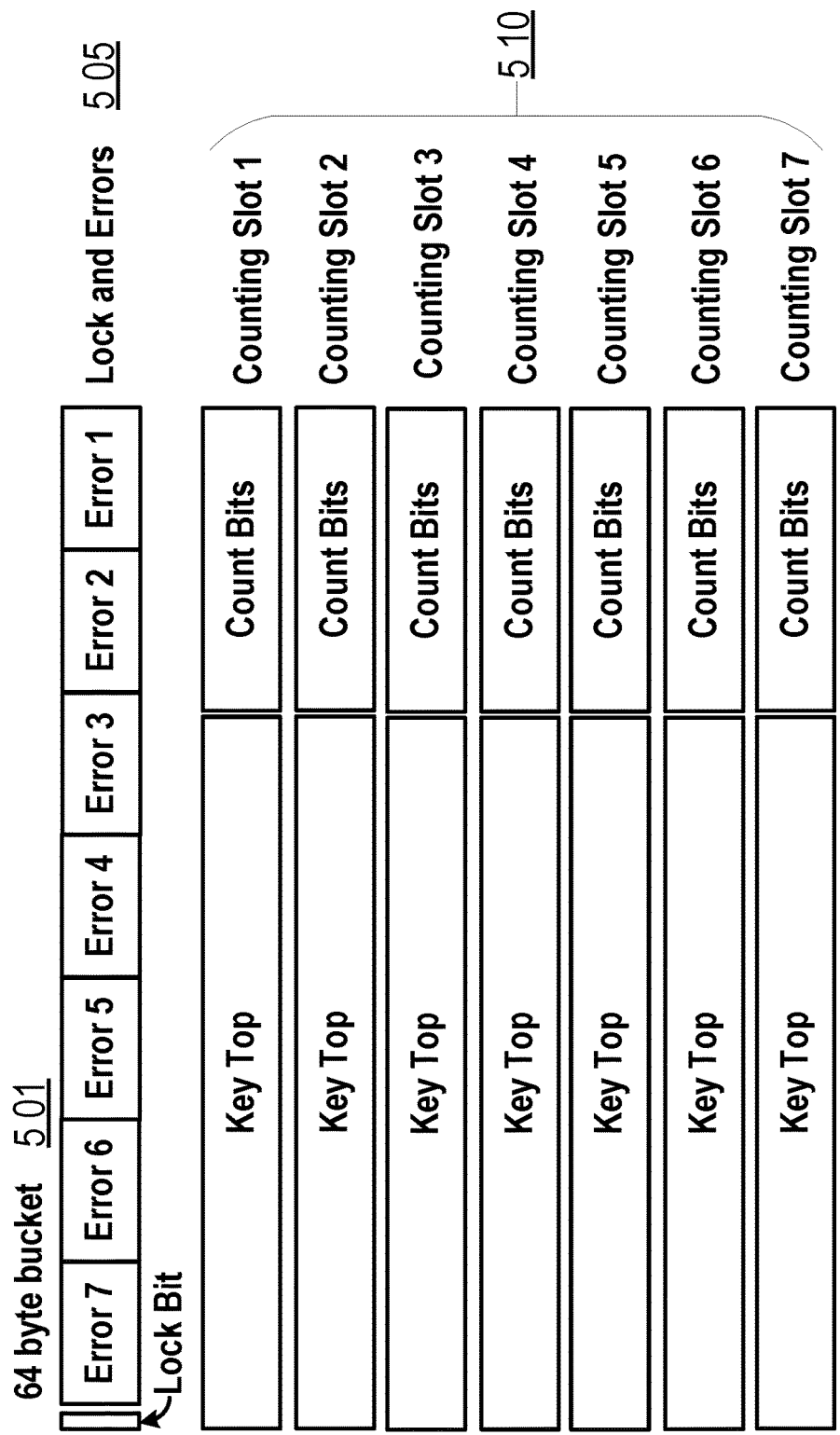
FIG. 5 shows an example data structure storing candidate key hashes and counts in one embodiment of KEY IDENTIFIER operation.

In one embodiment, an internal LongStreamSummary7 data structure is created with a fixed size based on the provided value of sizeBits (e.g., in the range of 9 to 27). In one implementation, this data structure represents $2^{sizeBits}$ buckets of, e.g., 64 bytes each. Therefore, the memory cost of this data structure is $2^{sizeBits}+6$ bytes (plus a small fixed overhead). An example implementation of a 64 byte bucket that may be used in conjunction with the LongStreamSummary7 and/or KEY IDENTIFIER embodiments discussed herein is shown in FIG. 5. Each 64 byte bucket 501 may, e.g., be composed of eight consecutive long (e.g., 64 bit) integers divided into one lockAndErrors structure 505 and seven counting slots 510. The first long integer in the bucket is the lockAndErrors structure 505. In one implementation, it has a single lock bit and seven 9 bit error values, one corresponding to each counting slot. In one implementation, each counting slot may be divided into two parts. The lower part is the count bits and is stored in the lowest sizeBits bits of the long integer. This allows for counts up to $2^{sizeBits}-1$. The remaining bits in the slot (e.g., 64—sizeBits) are reserved for the keyTop. For each key stored in the LongStreamSummary7 structure, a count of the number of times that key was seen or could have been seen (e.g., upper bound) may be stored in the counts bits of the counting slot. The corresponding error value stores the maximum value for the overestimation of the count (e.g., up to 511). In one implementation, the lower bound for the number of times a key has been seen is the error subtracted from the count.

In one implementation, all bits/values within a bucket are initialized to zero which creates an unlocked bucket with seven empty slots and no errors.

Counting Keys

Figure 6:
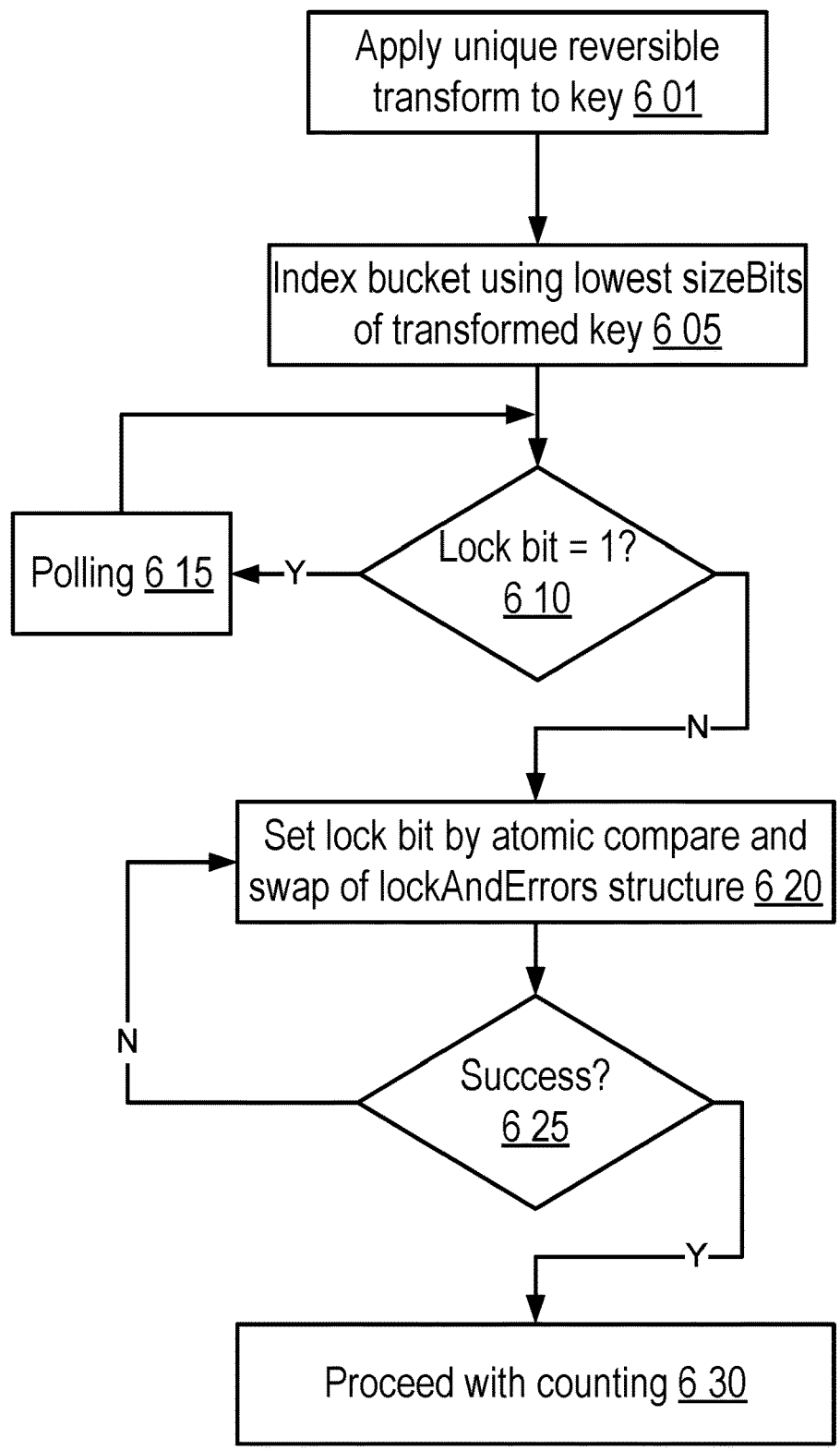
FIG. 6 shows an example of logic flow for counting preparation in one embodiment of KEY IDENTIFIER operation.

In one embodiment, each worker will have its own instance of a LongStreamSummary7 for local counting of (e.g., 64 bit) hash keys, as described in one embodiment in FIG. 6. When counting an instance of a given 64 bit hash key, that key may be transformed, in one implementation, into a new 64 bit integer according to a reversible transformation function unique to each instance of LongStreamSummary7 601. The reversible transformation function may, in various implementations, comprise a fast reversible multiply and shift bit mixer (e.g., employing relative primes and their modular multiplicative inverses), a reversible hash function, and/or the like. In one implementation, the lowest sizeBits of the transformed key may be used to index a specific bucket 605. The unique transform function implements a different distribution of keys to buckets for each worker. If there is a case where too many top K keys map to the same bucket for a given instance of LongStreamSummary7, the unique transform function makes that same set of bucket collisions very unlikely to happen on any other worker. Thus, using multiple workers substantially reduces the likelihood of any missed candidate hashes in the context of a KEY IDENTIFIER call.

In some implementations, once a bucket is selected, it may be locked. For example, a spin lock technique may be employed since the likelihood of concurrent modification is low given the relatively large number of buckets (compared to threads). In one implementation, if the highest bit of the lockAndErrors structure is set (1), the bucket may be locked by a different thread and the current thread waits until it becomes unset (0) 610. The transition is detected, for example through repeated volatile polling (e.g., spinning) 615. Once the bucket appears to be unlocked, the current thread attempts to lock the bucket by setting the lock bit, e.g., using an atomic compare and swap of the entire lockAndErrors structure 620. If and when the compare and swap succeeds 625, the current thread has obtained the lock and can proceed with the counting 630.

Figure 7A:
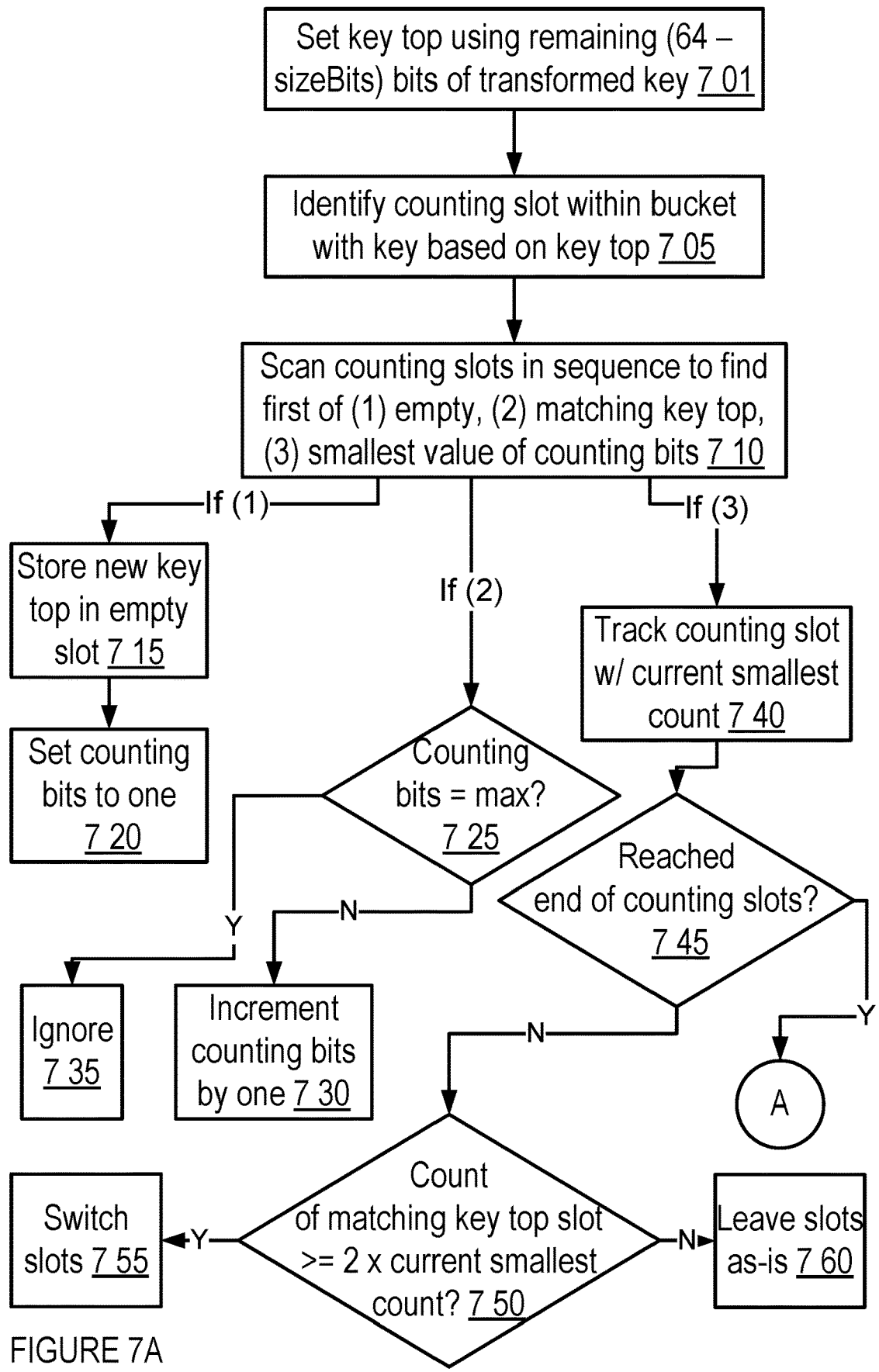
FIGS. 7A and 7B show an example of logic flow for counting keys in one embodiment of KEY IDENTIFIER operation.
Figure 7B:
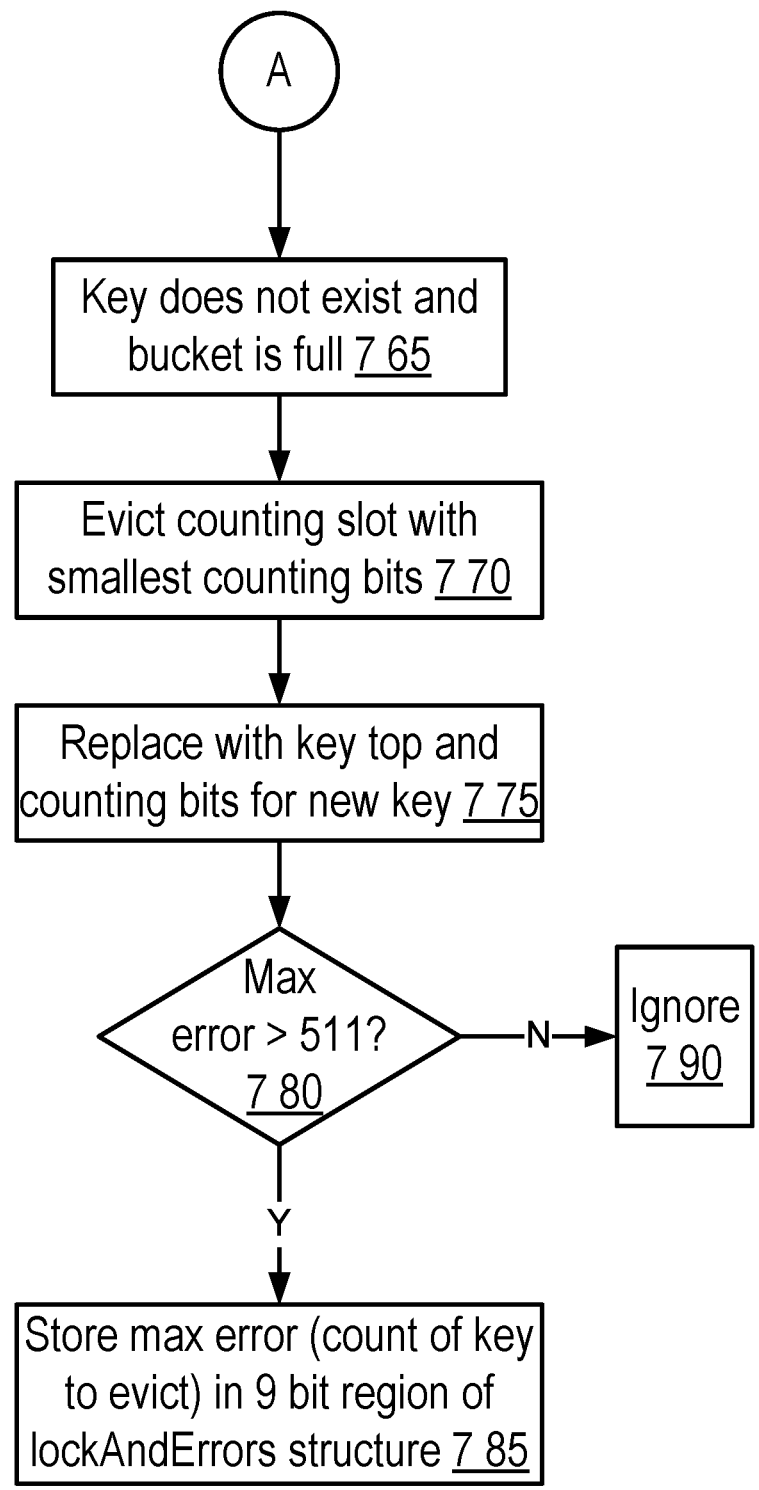

FIGS. 7A and 7B show aspects of logic flow for counting keys in one embodiment. In one implementation, the remaining (e.g., 64—sizeBits) bits of the transformed key not used to select the bucket, become the key top 701. This key top may be used, e.g., to identify a specific counting slot within a bucket with a specific key 705. In one implementation, once a bucket has been selected and locked, the counting slots are scanned, e.g., in sequence 710, to find the first one of the following:

1. An empty (unassigned) counting slot, indicated by 64 0 bits (0 key top and 0 counting bits)
2. A matching key top
3. The counting slot with the smallest value of counting bits In one implementation, if an empty counting slot is found before a matching key top and before the end of the counting slots is reached, the given key may be determined to not exist in the bucket. In this case, the empty slot may be used to store the new key top 715 and the corresponding counting bits may be set to one 720.

In one implementation, if a matching key top is found before an empty slot and before the end of the counting slots is reached, the given key may be determined to exist in the bucket at the matching slot. In this case, the counting bits may be incremented by one 730 unless the counting bits are already at the maximum value (e.g., $2^{sizeBits}-1$) 725. In one implementation, once the counting bits reach the maximum value, further counting attempts for that key may be ignored 735. In implementations of case 3 above, the counting slot with the current smallest count found may be tracked 740. If the count of the newly incremented matching key top slot is greater than or equal to twice the count of the current smallest count slot 750, the two slots may be switched (e.g., along with the corresponding error regions) 755 such that the slots with greater counts tend toward the front of the bucket while slots with lesser counts move toward the end of the bucket. Slots with greater counts have occurred more frequently and moving them to the front decreases the number of slots that need to be scanned before a matching key top is found for these keys. Otherwise, the slots may be left as is 760.

In one implementation, if the end of the counting slots is reached before an empty slot or matching key top is found 745, the given key may be determined to not exist in the bucket and the bucket is full 765. In this case, the counting slot with the smallest value of counting bits may be evicted from the bucket 770 and replaced with the values (e.g., key top and counting bits) for the new key 775. In one implementation, the smallest count slot may be selected for eviction in order to retain the top keys in the bucket. The key to add (that is currently not in the bucket) may be an entirely new key (e.g., never seen before) or a key that once was in the bucket, but was previously evicted by a different key. Because of this, the upper bound for the number of times the key to add has ever been seen may be one higher than the key to be evicted. In one implementation, a worst case scenario may be that the key to add was previously evicted from the bucket when it had a count equal to the smallest key currently in the bucket (it cannot be greater than the smallest key count in the bucket because only the smallest key count may be evicted and counts do not decrease). However, it is possible that the key to add has not been seen before, so the lower bound on the number of times it may have been seen is one (the current instance of the key). Therefore, the maximum error (overestimate) of the count stored in the count bits is equal to the count of the key to evict. In one implementation, this error value is stored in the 9 bit error region of the lockAndErrors structure corresponding to the counting slot of the key to evict 785. However, if the maximum error value is greater than 511, 780, it may not be possible to store it in the 9 bit region and the eviction and replacement may not take place (e.g., the key to add is ignored and the counting slots remain unchanged) 790. In such an implementation, the bucket becomes static and the keys currently assigned to the bucket do not change (but they may still be incremented as normal). In one implementation, the minimum number of key count attempts before a given bucket can become static is 3571 (7*510+1). If the top keys for a given bucket are already present when the bucket becomes static, nothing of value is lost. In other cases, one or more top keys may be omitted from the entire LongStreamSummary7 instance. This downside may be mitigated, for example, by having multiple workers with different key-to-bucket distributions whereby the same exact key omissions are very unlikely to occur. In one implementation, as long as at least one worker can return a key as a top K candidate, it will be considered by the master for inclusion in the global top K hash candidates.

In one implementation, regardless of any bucket changes, the lockAndErrors structure is atomically stored with the lock bit unset in order to unlock the bucket.

Getting the Stored Keys and Counts

Figure 8:
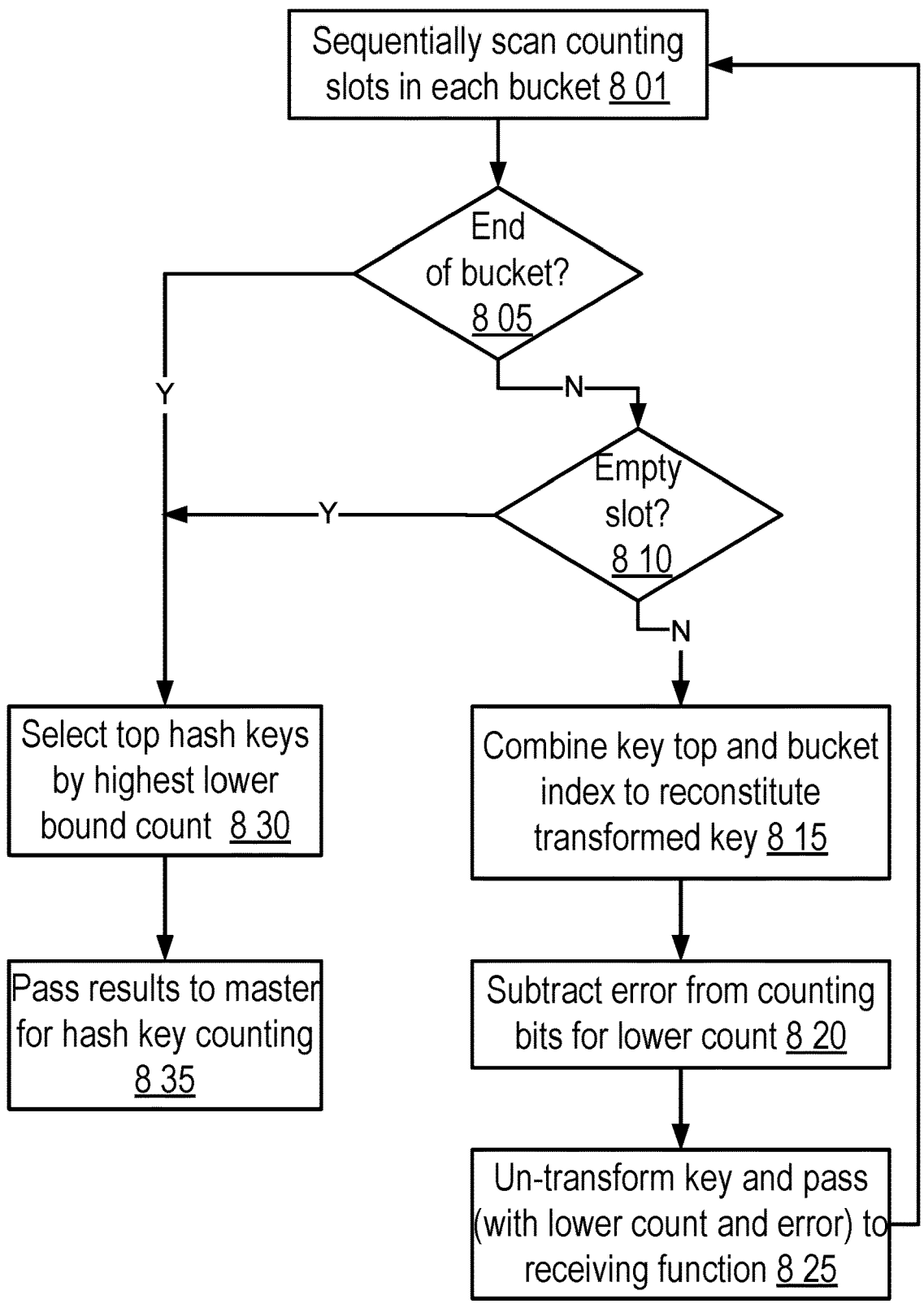
FIG. 8 shows an example of logic flow for key and count extraction in one embodiment of KEY IDENTIFIER operation.

In one embodiment, once the counting has been concluded, the keys and corresponding counts may be extracted, as shown in one embodiment in FIG. 8. For example, in one implementation, each bucket is scanned in sequence 801. Each counting slot within the bucket may be scanned in sequence until an empty slot is found 810 or the end of the bucket is reached 805. For each non-empty slot, the key top may be combined with the bucket index to reconstitute the transformed key 815. The value of the corresponding error region may be subtracted from the value of the counting bits to get the lower bound count 820. In one implementation, the transformed key is untransformed to get the original key which is passed to a receiving function (e.g., along with the lower bound count and the error value) 825. In one implementation, in the context of a KEY IDENTIFIER call, the receiving function may select the top (e.g., K*overprovisioning factor) hash keys by highest lower bound counts with higher errors breaking ties 830. These results may then be passed back to the master to complete the hash key counting phase 835.

In one implementation, the KEY IDENTIFIER may be configured for handling keys larger than 64 bits (e.g., doubling the slot and error region size to handle 128 bit keys).

In one implementation, the KEY IDENTIFIER may be configured for adding more slots and/or error regions to each bucket (e.g., 14 slots per bucket).

In one implementation, the KEY IDENTIFIER may be configured for mitigating potentially missed top keys, such as by using two LongStreamSummary7 structures per worker, each with a different transformation function.

KEY IDENTIFIER Controller

Figure 9:
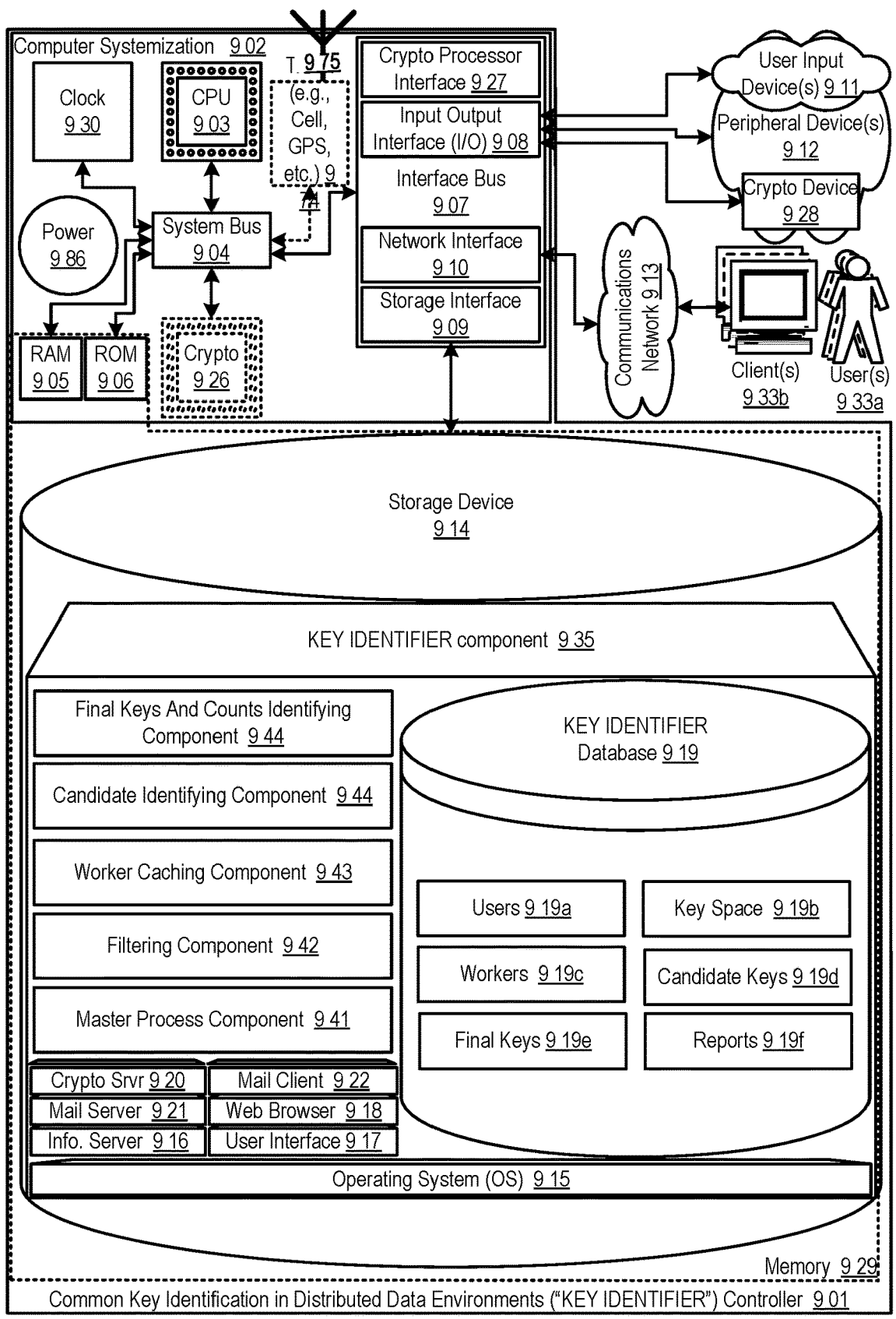
FIG. 9 shows a block diagram illustrating embodiments of a KEY IDENTIFIER controller.

FIG. 9 shows a block diagram illustrating embodiments of a KEY IDENTIFIER controller. In this embodiment, the KEY IDENTIFIER controller 901 may serve to aggregate, process, store, search, serve, identify, instruct, generate, match, and/or facilitate interactions with a computer through market analysis technologies, and/or other related data.

Typically, users, which may be people and/or other systems, may engage information technology systems (e.g., computers) to facilitate information processing. In turn, computers employ processors to process information; such processors 903 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 929 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the KEY IDENTIFIER controller 901 may be connected to and/or communicate with entities such as, but not limited to: one or more users from user input devices 911; peripheral devices 912; an optional cryptographic processor device 928; and/or a communications network 913.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The KEY IDENTIFIER controller 901 may be based on computer systems that may comprise, but are not limited to, components such as: a computer systemization 902 connected to memory 929.

Computer Systemization

A computer systemization 902 may comprise a clock 930, central processing unit ("CPU(s)" and/or "processor(s)"

(these terms are used interchangeable throughout the disclosure unless noted to the contrary)) 903, a memory 929 (e.g., a read only memory (ROM) 906, a random access memory (RAM) 905, etc.), and/or an interface bus 907, and most frequently, although not necessarily, are all interconnected and/or communicating through a system bus 904 on one or more (mother)board(s) 902 having conductive and/or otherwise transportive circuit pathways through which instructions (e.g., binary encoded signals) may travel to effectuate communications, operations, storage, etc. The computer systemization may be connected to a power source 986; e.g., optionally the power source may be internal. Optionally, a cryptographic processor 926 and/or transceivers (e.g., ICs) 974 may be connected to the system bus. In another embodiment, the cryptographic processor and/or transceivers may be connected as either internal and/or external peripheral devices 912 via the interface bus I/O. In turn, the transceivers may be connected to antenna(s) 975, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing KEY IDENTIFIER controller to determine its location)); Broadcom BCM4329FKUBG transceiver chip (e.g., providing 802.1 in, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 929 beyond the processor itself, internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the KEY IDENTIFIER controller and beyond through various interfaces. Should processing requirements dictate a greater amount speed and/or capacity, distributed processors (e.g., Distributed KEY IDENTIFIER), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the KEY IDENTIFIER may be achieved by implementing a microcontroller such as CAST's R8051XC2 microcontroller; Intel's MCS 51 (i.e., 8051 microcontroller); and/or the like. Also, to implement certain features of the KEY IDENTIFIER, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the KEY IDENTIFIER component collection (distributed or otherwise) and/or features may be implemented via the microprocessor and/or via embedded components; e.g., via ASIC, coprocessor, DSP, FPGA, and/or the like. Alternately, some implementations of the KEY IDENTIFIER may be implemented with embedded components that are configured and used to achieve a variety of features or signal processing.

Depending on the particular implementation, the embedded components may include software solutions, hardware solutions, and/or some combination of both hardware/software solutions. For example, KEY IDENTIFIER features discussed herein may be achieved through implementing FPGAs, which are a semiconductor devices containing programmable logic components called "logic blocks," and programmable interconnects, such as the high performance FPGA Virtex series and/or the low cost Spartan series manufactured by Xilinx. Logic blocks and interconnects can be programmed by the customer or designer, after the FPGA is manufactured, to implement any of the KEY IDENTIFIER features. A hierarchy of programmable interconnects allow logic blocks to be interconnected as needed by the KEY IDENTIFIER system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the KEY IDENTIFIER may be developed on regular FPGAs and then migrated into a fixed version that more resembles ASIC implementations. Alternate or coordinating implementations may migrate KEY IDENTIFIER controller features to a final ASIC instead of or in addition to FPGAs. Depending on the implementation all of the aforementioned embedded components and microprocessors may be considered the "CPU" and/or "processor" for the KEY IDENTIFIER.

Power Source

The power source 986 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 986 is connected to at least one of the interconnected subsequent components of the KEY IDENTIFIER thereby providing an electric current to all subsequent components. In one example, the power source 986 is connected to the system bus component 904. In an alternative embodiment, an outside power source 986 is provided through a connection across the I/O 908 interface. For example, a USB and/or IEEE 1394 connection carries both data and power across the connection and is therefore a suitable source of power.

Interface Adapters

Interface bus(ses) 907 may accept, connect, and/or communicate to a number of interface adapters, conventionally although not necessarily in the form of adapter cards, such as but not limited to: input output interfaces (I/O) 908, storage interfaces 909, network interfaces 910, and/or the like. Optionally, cryptographic processor interfaces 927 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 909 may accept, communicate, and/or connect to a number of storage devices such as, but not limited to: storage devices 914, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 910 may accept, communicate, and/or connect to a communications network 913. Through a communications network 913, the KEY IDENTIFIER controller is accessible through remote clients 933b (e.g., computers with web browsers) by users 933a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed KEY IDENTIFIER), architectures may similarly be employed to pool, load balance, and/or otherwise increase the communicative bandwidth required by the KEY IDENTIFIER controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 910 may be used to engage with various communications network types 913. For example, multiple network interfaces may be employed to allow for the communication over broadcast, multicast, and/or unicast networks.

Input Output interfaces (I/O) 908 may accept, communicate, and/or connect to user input devices 911, peripheral devices 912, cryptographic processor devices 928, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 911 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 912 may be connected and/or communicate to I/O and/or other facilities of the like such as network interfaces, storage interfaces, directly to the interface bus, system bus, the CPU, and/or the like. Peripheral devices may be external, internal and/or part of the KEY IDENTIFIER controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the KEY IDENTIFIER controller may be embodied as an embedded, dedicated, and/or monitor-less (i.e., headless) device, wherein access would be provided over a network interface connection.

Cryptographic units such as, but not limited to, microcontrollers, processors 926, interfaces 927, and/or devices 928 may be attached, and/or communicate with the KEY IDENTIFIER controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 929. However, memory is a fungible technology and resource, thus, any number of memory embodiments may be employed in lieu of or in concert with one another. It is to be understood that the KEY IDENTIFIER controller and/or a computer systemization may employ various forms of memory 929. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 929 will include ROM 906, RAM 905, and a storage device 914. A storage device 914 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 929 may contain a collection of program and/or database components and/or data such as, but not limited to: operating system component(s) 915 (operating system); information server component(s) 916 (information server); user interface component(s) 917 (user interface); Web browser component(s) 918 (Web browser); database(s) 919; mail server component(s) 921; mail client component(s) 922; cryptographic server component(s) 920 (cryptographic server); the KEY IDENTIFIER component(s) 935; and/or the like (i.e., collectively a component collection). These components may be stored and accessed from the storage devices and/or from storage devices accessible through an interface bus. Although non-conventional program components such as those in the component collection, typically, are stored in a local storage device 914, they may also be loaded and/or stored in memory such as: peripheral devices, RAM, remote storage facilities through a communications network, ROM, various forms of memory, and/or the like.

Operating System

The operating system component 915 is an executable program component facilitating the operation of the KEY IDENTIFIER controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the KEY IDENTIFIER controller to communicate with other entities through a communications network 913. Various communication protocols may be used by the KEY IDENTIFIER controller as a subcarrier transport mechanism for interaction, such as, but not limited to: multicast, TCP/IP, UDP, unicast, and/or the like.

Information Server

An information server component 916 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C # and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the KEY IDENTIFIER controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the KEY IDENTIFIER database 919, operating systems, other program components, user interfaces, Web browsers, and/or the like.

Access to the KEY IDENTIFIER database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the KEY IDENTIFIER. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the KEY IDENTIFIER as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 917 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 918 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the KEY IDENTIFIER enabled nodes. The combined application may be nugatory on systems employing standard Web browsers.

Mail Server

A mail server component 921 is a stored program component that is executed by a CPU 903. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C # and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the KEY IDENTIFIER.

Access to the KEY IDENTIFIER mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 922 is a stored program component that is executed by a CPU 903. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 920 is a stored program component that is executed by a CPU 903, cryptographic processor 926, cryptographic processor interface 927, cryptographic processor device 928, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the KEY IDENTIFIER may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the KEY IDENTIFIER component to engage in secure transactions if so desired. The cryptographic component facilitates the secure accessing of resources on the KEY IDENTIFIER and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The KEY IDENTIFIER Database

The KEY IDENTIFIER database component 919 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the KEY IDENTIFIER database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the KEY IDENTIFIER database is implemented as a data-structure, the use of the KEY IDENTIFIER database 919 may be integrated into another component such as the KEY IDENTIFIER component 935. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 919 includes several tables 919a-1. A Users table 919a may include fields such as, but not limited to: user_ID, name, login, password, contact_info, query-history, settings, preferences, workers_ID(s), KeySpace_ID(s), reports_ID(s), and/or the like. The user table may support and/or track multiple entity accounts on a KEY IDENTIFIER. A Key Space table 919b may include fields such as, but not limited to: keyspace_ID, data_feed ID(s), keyspace_type, data_type, data_content, fields, data_parameters, filters, and/or the like. In one implementation, the Key Space table may be populated by one or more social media data feeds (e.g., Facebook status updates, Twitter feed, and/or the like), by one or more market data feeds (e.g., Bloomberg's PhatPipe, Dun & Bradstreet, Reuter'sTib, Triarch, etc.), and/or the like, such as, for example, through Microsoft's Active Template Library and Dealing Object Technology's real-time toolkit Rtt.Multi. A Workers table 919c may include fields such as, but not limited to: workers_ID, user_ID(s), candidatekeys_ID(s), worker type, worker_history, LongStreamSummary7_data, transform, and/or the like. A Candidate Keys table 919d may include fields such as, but not limited to: candidatekeys_ID, keyspace_ID(s), workers_ID(s), candidate_key(s), candidate_key_count(s), candidate_key_rank(s), lock_and_error(s), lock bit(s), key top(s), count bit(s), and/or the like. A Final Keys table 919e may include fields such as, but not limited to: finalkeysID, candidatekeys_ID(s), keyspace_ID(s), workers_ID(s), key(s), key_count(s), key_rank(s), categories, and/or the like. A Reports table 919d may include fields such as, but not limited to: report_ID, keyspace_ID(s), workers_ID(s), finalkeysID(s), candidatekeysID(s), report name, report template, key(s), key_count(s), key_rank(s), and/or the like.

In one embodiment, the KEY IDENTIFIER database may interact with other database systems. For example, employing a distributed database system, queries and data access by search KEY IDENTIFIER component may treat the combination of the KEY IDENTIFIER database, an integrated data security layer database as a single database entity.

In one embodiment, user programs may contain various user interface primitives, which may serve to update the KEY IDENTIFIER. Also, various accounts may require custom database tables depending upon the environments and the types of clients the KEY IDENTIFIER may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 919a-1. The KEY IDENTIFIER may be configured to keep track of various settings, inputs, and parameters via database controllers.

The KEY IDENTIFIER database may communicate to and/or with other components in a component collection, including itself, and/or facilities of the like. Most frequently, the KEY IDENTIFIER database communicates with the KEY IDENTIFIER component, other program components, and/or the like. The database may contain, retain, and provide information regarding other nodes and data.

The KEY IDENTIFIERs

The KEY IDENTIFIER component 935 is a stored program component that is executed by a CPU. In one embodiment, the KEY IDENTIFIER component incorporates any and/or all combinations of the aspects of the KEY IDENTIFIER that was discussed in the previous figures. As such, the KEY IDENTIFIER affects accessing, obtaining and the provision of information, services, transactions, and/or the like across various communications networks. The features and embodiments of the KEY IDENTIFIER discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the KEY IDENTIFIER's features and facilities, and in many cases reduce the costs, energy consumption/requirements, and extend the life of KEY IDENTIFIER's underlying infrastructure; this has the added benefit of making the KEY IDENTIFIER more reliable. Similarly, many of the features and mechanisms are designed to be easier for users to use and access, thereby broadening the audience that may enjoy/employ and exploit the feature sets of the KEY IDENTIFIER; such ease of use also helps to increase the reliability of the KEY IDENTIFIER. In addition, the feature sets include heightened security as noted via the Cryptographic components 920, 926, 928 and throughout, making access to the features and data more reliable and secure The KEY IDENTIFIER transforms raw data, query, and, UI interaction inputs via KEY IDENTIFIER Master Process 941, Filtering 942, Worker Caching 943, Top Candidate Identifying 944, and Final Keys And Counts Identifying 945 components into query result outputs, keys, counts, and/or the like.

The KEY IDENTIFIER component enabling access of information between nodes may be developed by employing standard development tools and languages such as, but not limited to: Apache components, Assembly, ActiveX, binary executables, (ANSI) (Objective-17) C (++), C # and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the KEY IDENTIFIER server employs a cryptographic server to encrypt and decrypt communications. The KEY IDENTIFIER component may communicate to and/or with other components in a component collection, including itself, and/or facilities of the like. Most frequently, the KEY IDENTIFIER component communicates with the KEY IDENTIFIER database, operating systems, other program components, and/or the like. The KEY IDENTIFIER may contain, communicate, generate, obtain, and/or provide program component, system, user, and/or data communications, requests, and/or responses.

Distributed KEY IDENTIFIERs

The structure and/or operation of any of the KEY IDENTIFIER node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the KEY IDENTIFIER controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the KEY IDENTIFIER controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
```

-continued

```
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:
http://publib.boulder.ibm.com/infocenter/tivihelp/v2r1/index.jsp?topic=/com.ibm.IBMDI.doc/referenceguide259.htm all of which are hereby expressly incorporated by reference.

In order to address various issues and advance the art, the entirety of this application for APPARATUSES, METHODS AND SYSTEMS FOR COMMON KEY IDENTIFICATION IN DISTRIBUTED DATA ENVIRONMENTS (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims.

What is claimed is:

1. A processor-implemented method, comprising:
receiving a client request to identify top keys for a keyspace;
providing a hash query and unique ID to each of a plurality of keyspace worker nodes;
receiving from each of the plurality of keyspace worker nodes a set of top candidate hashes and corresponding counts;
identifying a set of global top candidate hashes based on the set of top candidate hashes and corresponding counts received from each of the plurality of keyspace worker nodes;
providing a counts query to each of the plurality of keyspace worker nodes based on the set of global top candidate hashes;
receiving a set of top candidate counts from each of the plurality of keyspace worker nodes based on the counts query, wherein the set of top candidate hashes and corresponding counts received from each of the plurality of keyspace worker nodes includes top candidate hash error values;
aggregating the set of top candidate counts received from each of the plurality of keyspace worker nodes to generate a set of global top key counts;
selecting a set of top keys based on the set of global top key counts; and
providing the set of top keys in response to the client request.

2. The processor-implemented method of claim 1, wherein the set of top candidate hashes and corresponding counts is generated by each of the plurality of keyspace worker nodes based on a three-fold uniform threshold process.

3. The processor-implemented method of claim 1, wherein the set of top candidate hashes and corresponding counts is generated by each of the plurality of keyspace worker nodes based on a LongStreamSummary7 process.

4. The processor-implemented method of claim 1, wherein the top candidate hash error values are determined based on the difference between upper bound and lower bound counts for each candidate hash of the set of top candidate hashes.

5. The processor-implemented method of claim 1, wherein the number of candidate keys associated with the set of top candidate hashes is larger than the number of top keys associated with the client request by an overprovisioning factor.

6. The processor-implemented method of claim 1, wherein the hash query includes at least one flavor designation.

7. The processor-implemented method of claim 6, wherein the set of top candidate hashes is sorted based on the flavor.

8. The processor-implemented method of claim 1, wherein identifying a set of global top candidate hashes further comprises:
   determining a theoretical upper bound count for each of the set of top candidate hashes; and
   comparing the theoretical upper bound count to a partial sum of aggregated counts for the each of the set of top candidate hashes.

9. The processor-implemented method of claim 8, wherein the theoretical upper bound count is based on a count of non-reporting worker nodes from the plurality of keyspace worker nodes.

10. The processor-implemented method of claim 1, further comprising:
    categorizing top keys associated with the set of global top key counts.

11. An apparatus, comprising:
    a processor;
    a memory disposed in connection with the processor and storing program instructions that, when executed, cause the processor to:
        receive a client request to identify top keys for a keyspace;
        provide a hash query and unique ID to each of a plurality of keyspace worker nodes;
        receive from each of the plurality of keyspace worker nodes a set of top candidate hashes and corresponding counts;
        identify a set of global top candidate hashes based on the set of top candidate hashes and corresponding counts received from each of the plurality of keyspace worker nodes;
        provide a counts query to each of the plurality of keyspace worker nodes based on the set of global top candidate hashes;
        receive a set of top candidate counts from each of the plurality of keyspace worker nodes based on the counts query, wherein the set of top candidate hashes and corresponding counts received from each of the plurality of keyspace worker nodes includes top candidate hash error values;
        aggregate the set of top candidate counts received from each of the plurality of keyspace worker nodes to generate a set of global top key counts;
        select a set of top keys based on the set of global top key counts; and
        provide the set of top keys in response to the client request.

12. A processor-accessible, non-transitory medium storing processor-issuable program instructions, comprising:
    receive a client request to identify top keys for a keyspace;
    provide a hash query and unique ID to each of a plurality of keyspace worker nodes;
    receive from each of the plurality of keyspace worker nodes a set of top candidate hashes and corresponding counts;
    identify a set of global top candidate hashes based on the set of top candidate hashes and corresponding counts received from each of the plurality of keyspace worker nodes;
    provide a counts query to each of the plurality of keyspace worker nodes based on the set of global top candidate hashes;
    receive a set of top candidate counts from each of the plurality of keyspace worker nodes based on the counts query, wherein the set of top candidate hashes and corresponding counts received from each of the plurality of keyspace worker nodes includes top candidate hash error values;
    aggregate the set of top candidate counts received from each of the plurality of keyspace worker nodes to generate a set of global top key counts;
    select a set of top keys based on the set of global top key counts; and
    provide the set of top keys in response to the client request.

13. A processor-implemented method, comprising:
    receiving a client request to identify top keys for a keyspace;
    providing a hash query and unique ID to each of a plurality of keyspace worker nodes;
    receiving from each of the plurality of keyspace worker nodes a set of top candidate hashes and corresponding counts;
    identifying a set of global top candidate hashes based on the set of top candidate hashes and corresponding counts received from each of the plurality of keyspace worker nodes;
    providing a counts query to each of the plurality of keyspace worker nodes based on the set of global top candidate hashes;
    receiving a set of top candidate counts from each of the plurality of keyspace worker nodes based on the counts query, wherein the set of top candidate hashes and corresponding counts is generated by each of the plurality of keyspace worker nodes based on a three-fold uniform threshold process;
    aggregating the set of top candidate counts received from each of the plurality of keyspace worker nodes to generate a set of global top key counts;
    selecting a set of top keys based on the set of global top key counts; and
    providing the set of top keys in response to the client request.

14. A processor-implemented method, comprising:
    receiving a client request to identify top keys for a keyspace;
    providing a hash query and unique ID to each of a plurality of keyspace worker nodes;
    receiving from each of the plurality of keyspace worker nodes a set of top candidate hashes and corresponding counts;
    identifying a set of global top candidate hashes based on the set of top candidate hashes and corresponding counts received from each of the plurality of keyspace worker nodes;
    providing a counts query to each of the plurality of keyspace worker nodes based on the set of global top candidate hashes;
    receiving a set of top candidate counts from each of the plurality of keyspace worker nodes based on the counts query, wherein the set of top candidate hashes and corresponding counts is generated by each of the plurality of keyspace worker nodes based on a LongStreamSummary7 process;
aggregating the set of top candidate counts received from each of the plurality of keyspace worker nodes to generate a set of global top key counts;
selecting a set of top keys based on the set of global top key counts; and
providing the set of top keys in response to the client request.

15. A processor-implemented method, comprising:
receiving a client request to identify top keys for a keyspace;
providing a hash query and unique ID to each of a plurality of keyspace worker nodes, wherein the hash query includes at least one flavor designation;
receiving from each of the plurality of keyspace worker nodes a set of top candidate hashes and corresponding counts;
identifying a set of global top candidate hashes based on the set of top candidate hashes and corresponding counts received from each of the plurality of keyspace worker nodes;
providing a counts query to each of the plurality of keyspace worker nodes based on the set of global top candidate hashes;
receiving a set of top candidate counts from each of the plurality of keyspace worker nodes based on the counts query, wherein the set of top candidate hashes and corresponding counts is sorted based on the flavor;
aggregating the set of top candidate counts received from each of the plurality of key space worker nodes to generate a set of global top key counts;
selecting a set of top keys based on the set of global top key counts; and
providing the set of top keys in response to the client request.

16. A processor-implemented method, comprising:
receiving a client request to identify top keys for a keyspace;
providing a hash query and unique ID to each of a plurality of keyspace worker nodes;
receiving from each of the plurality of keyspace worker nodes a set of top candidate hashes and corresponding counts;
identifying a set of global top candidate hashes based on the set of top candidate hashes and corresponding counts received from each of the plurality of keyspace worker nodes, including:
    determining a theoretical upper bound count for each of the set of top candidate hashes, and
    comparing the theoretical upper bound count to a partial sum of aggregated counts for the each of the set of top candidate hashes;
providing a counts query to each of the plurality of keyspace worker nodes based on the set of global top candidate hashes;
receiving a set of top candidate counts from each of the plurality of keyspace worker nodes based on the counts query;
aggregating the set of top candidate counts received from each of the plurality of keyspace worker nodes to generate a set of global top key counts;
selecting a set of top keys based on the set of global top key counts; and
providing the set of top keys in response to the client request.

* * * * *